Figure 1:
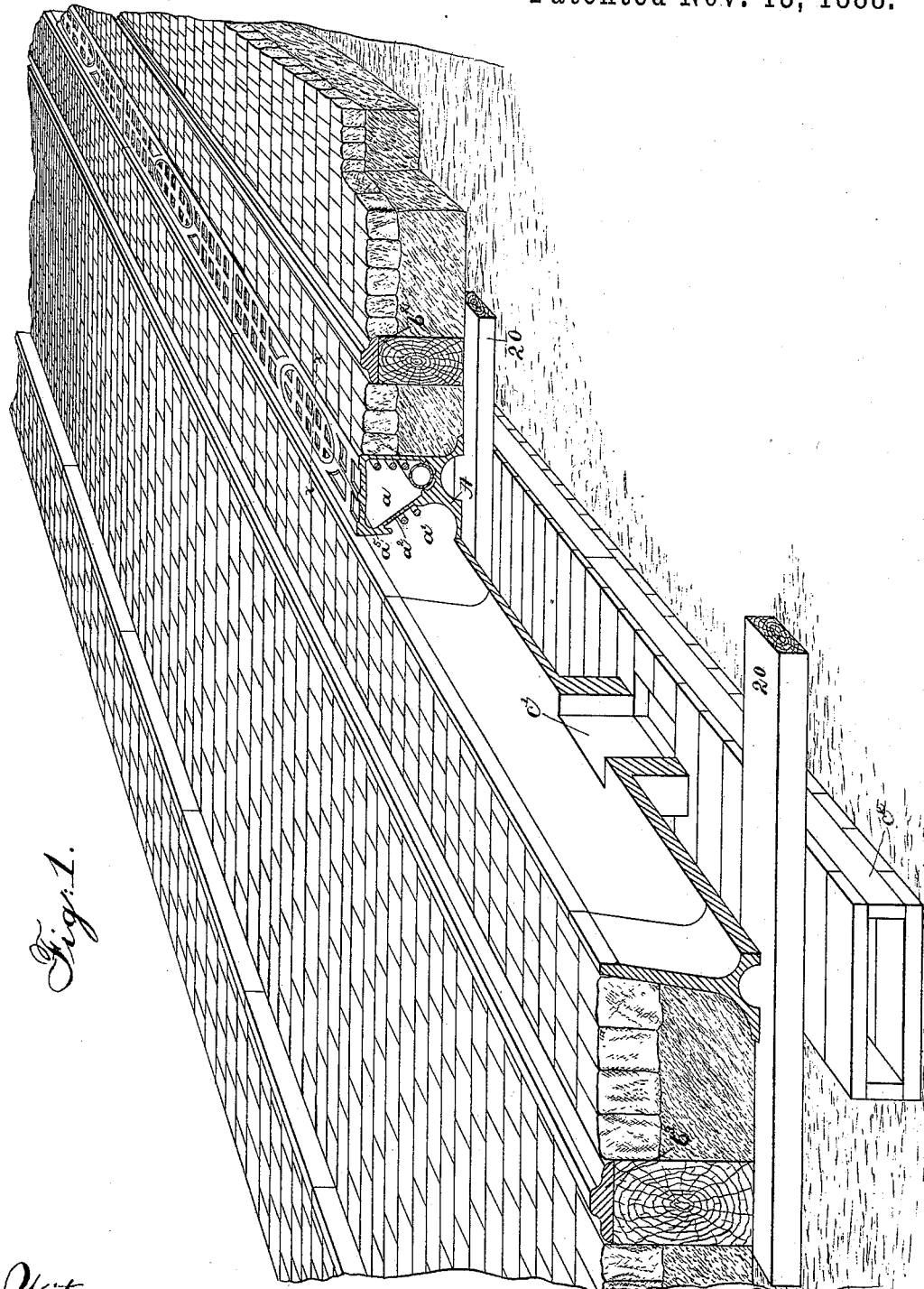

(No Model.)  4 Sheets—Sheet 1.

H. A. CHASE.
CONDUIT FOR ELECTRIC RAILWAYS.

No. 392,664.  Patented Nov. 13, 1888.

Witnesses.
Howard F. Eaton.
Fred. S. Greenleaf.

Inventor:
Henry A. Chase,
by Crosby & Gregory.
Attys.

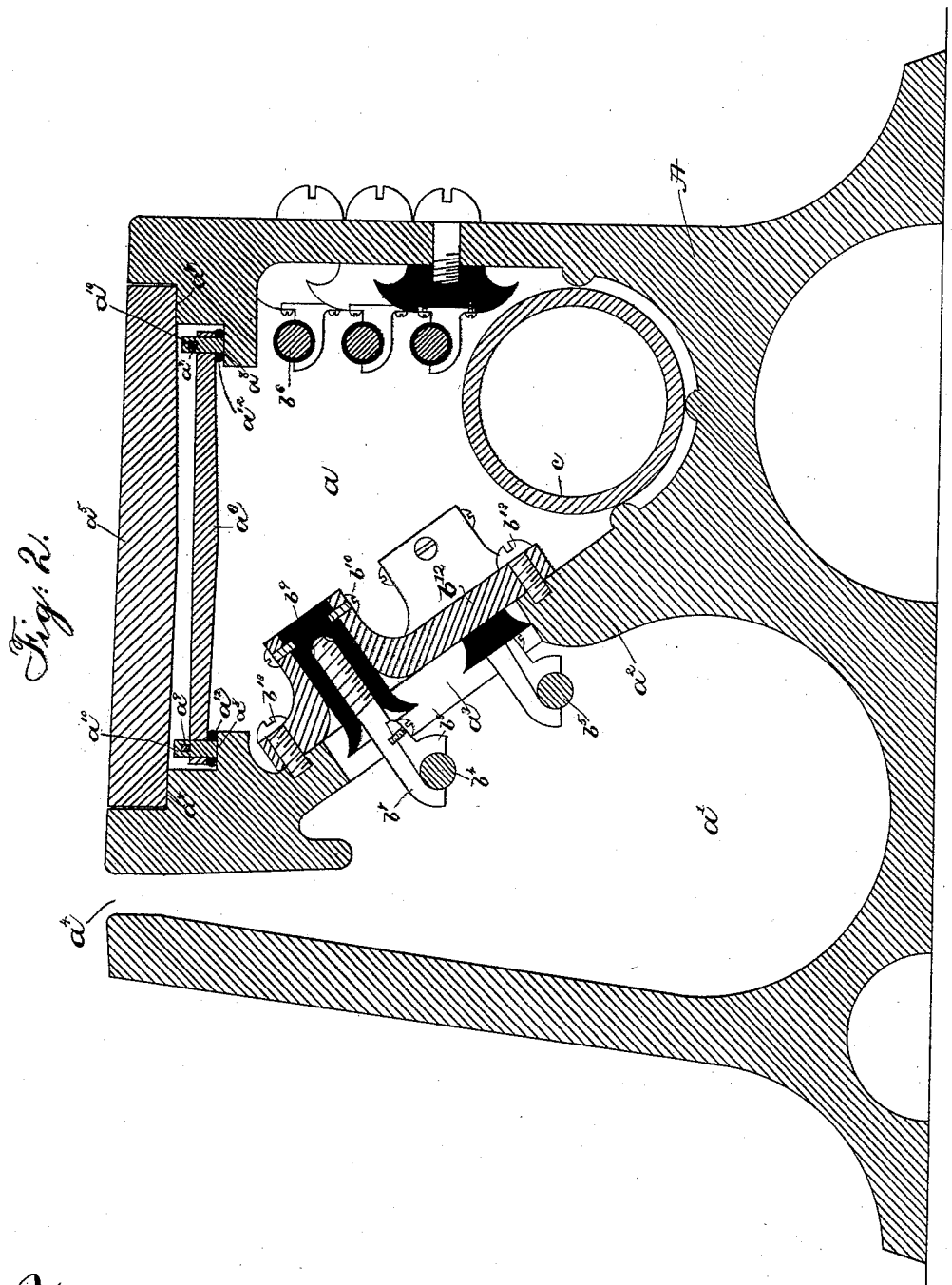

(No Model.) 4 Sheets—Sheet 3.
H. A. CHASE.
CONDUIT FOR ELECTRIC RAILWAYS.
No. 392,664. Patented Nov. 13, 1888.
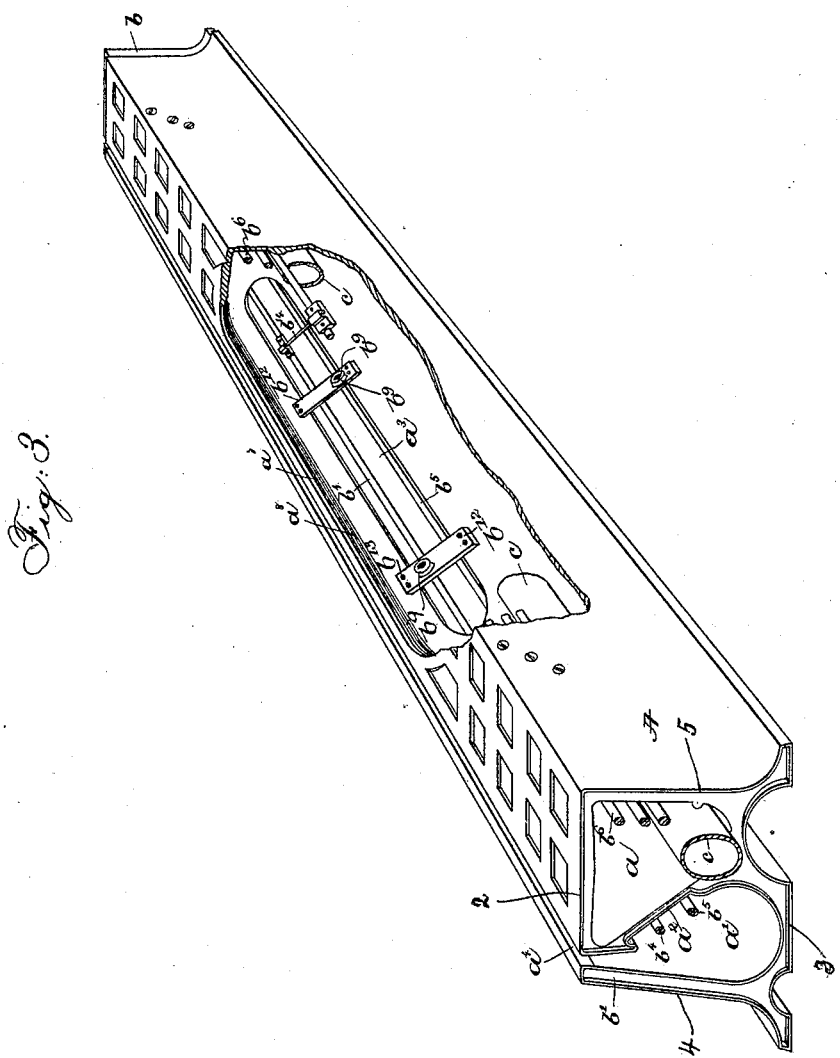
Witnesses.
Howard F. Eaton.
Fred. S. Greenleaf.
Inventor.
Henry A. Chase,
by Gregory
attys.

(No Model.) 4 Sheets—Sheet 4.
H. A. CHASE.
CONDUIT FOR ELECTRIC RAILWAYS.
No. 392,664. Patented Nov. 13, 1888.
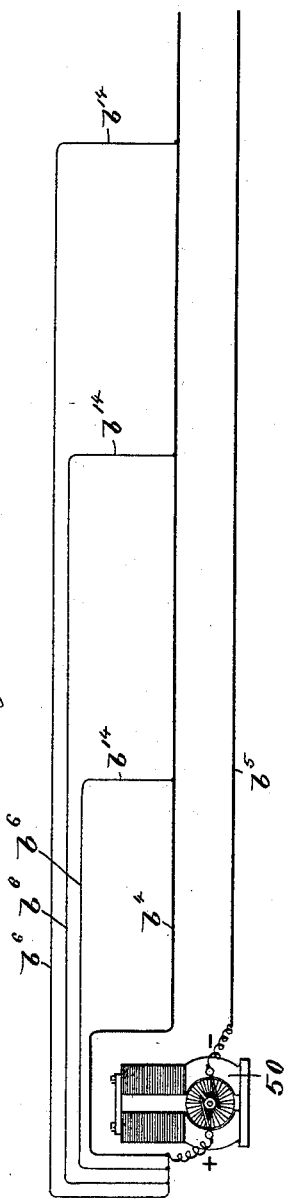
Witnesses.
Howard F. Eaton
Frederick L. Emery
Inventor.
Henry A. Chase,
by Crosby & Gregory
Attys.

UNITED STATES PATENT OFFICE.

HENRY A. CHASE, OF STONEHAM, MASSACHUSETTS.

CONDUIT FOR ELECTRIC RAILWAYS.

SPECIFICATION forming part of Letters Patent No. 392,664, dated November 13, 1888.

Application filed December 21, 1887. Serial No. 258,576. (No model.)

*To all whom it may concern:*

Be it known that I, HENRY A. CHASE, of Stoneham, county of Middlesex, and State of Massachusetts, have invented an Improvement in Conduits for Electric and Cable Railways, of which the following description, in connection with the accompanying drawings, is a specification, like letters on the drawings representing like parts.

This invention relates to conduits for street-railways, and has for its object to provide an accessible conduit which may be employed either for cable or electric street-railways, or both together.

In conduits as heretofore constructed and known to me, especially when used for electric-railway purposes, the wires or electric conductors have been placed in suitable pipes, usually of water-proof insulating material, and buried or incased in a bed of asphalt, bitumen, or other like compound, which, when the conduit was completed, formed part of or lay below the surface of the road-bed.

To repair or renew any or all of the wires laid in conduits of the class referred to it is necessary to dig up the road-bed, thereby materially blocking traffic and occasioning other vexatious delays, besides rendering the circuit of which the said wires form a part inoperative for a considerable length of time.

In accordance with my invention I provide a conduit constructed as will be described, wherein the wires or conductors and supports therefor are readily accessible for repairing, renewing, testing, cleaning, and like purposes, without in the least disturbing the road-bed or surface of the street in which the conduit is located.

My improved conduit referred to is composed of sections suitably jointed together to form one continuous conduit, each section being preferably made in one casting to form two chambers, one of which I shall hereinafter designate as the "accessible chamber," and the other as the "slot-chamber." The slot-chamber, when the conduit is to be used for a cable railway, will contain the usual cable and grip, the latter being extended about and outside of the conduit through a longitudinal slot in the casting, and when used for an electric conduit the said slot-chamber will contain the main conductors. Each conduit-section will preferably be cast to leave an opening or slot—preferably of considerable area—in the wall separating the slot-chamber from the accessible chamber, the latter being provided at its top or roof with preferably double covers rendered water-tight by suitable gasket-joints or packing, the said covers, when removed, affording access to the conduit from the street. The accessible chamber will preferably contain one or more pipes, through which steam or heated air may be circulated to heat the said chamber and maintain it substantially dry, the heat in the accessible chamber passing into the slot-chamber through the opening referred to, thus raising the temperature of this latter chamber and preventing or largely obviating the formation of ice in cold weather.

When the conduit is to be used for an electric railway, the main conductor will be located in the slot-chamber, and it may have connected to it one or more auxiliary conductors located in the accessible chamber and connected to the main conductor by wires extended through the slot in the wall between the accessible and slot chambers, the main conductor being sustained by supports preferably secured to a bridge-piece which spans the opening referred to in the wall between the accessible and slot chambers.

The slot-chamber will preferably be connected to a sub-drain located beneath the conduit by ducts or passages communicating with the slot-chamber at suitable intervals apart, and by which water may flow off from the slot-chamber.

The particular features in which my invention consist will be pointed out in the claims at the end of this specification.

Figure 1 shows a perspective view, partially broken out, of a sufficient portion of a street provided with my improved conduit to enable my invention to be understood. Fig. 2 is a transverse section of the conduit, on an enlarged scale, through the removable covers about in the dotted line *x x*; Fig. 3, a perspective of a conduit-section broken out to more clearly show the interior construction and arrangement of parts underneath the cover, and Fig. 4 a diagram to more clearly show the arrangement of circuits in the conduit.

The conduit-section A, composed of a top, 2, bottom 3, and sides 4 5—preferably of iron—is preferably cast with a longitudinal wall, $a^2$, connecting the top 2 with the bottom 3, forming chambers $a$ $a'$, the said wall having, as shown in Fig. 3, a preferably longitudinal opening, $a^3$, through which communication may be had between said chambers. The chamber $a$ constitutes the accessible chamber of my improved conduit and the chamber $a'$ the slot-chamber, the latter chamber having a slot, $a^4$, made in the surface or upper face of the casting and extended the length of the said conduit-section. The top 2 or upper face of the casting, forming the roof of the accessible chamber $a$, is provided with an opening or slot, which in practice is closed, as herein shown, by two removable covers, $a^5$ $a^6$, (see Fig. 2,) supported, as shown, upon ledges or shoulders $a^7$ $a^8$ of the casting, the upper cover, $a^5$, being loosely fitted upon the shoulders $a^7$ and the cover $a^6$ firmly secured upon the shoulder $a^8$, it being herein shown as fastened at opposite ends by a key, $a^9$, inserted in a slot in a pin, $a^{10}$, screwed or otherwise secured to the shoulder $a^8$ and extended through a suitable slot or opening in the cover $a^6$, the said cover resting upon a suitable packing, $a^{12}$, to render it substantially air and water tight.

Each conduit-section will preferably be formed with a flange, $b$, at one end and a groove or socket, $b'$, at its opposite end, as shown in Fig. 3, the said flange of one section being fitted into the groove $b'$ of the next adjacent section to form a continuous conduit, as shown in Fig. 1, the joint between the said section being rendered substantially water-tight by suitable packing, (not shown,) and, if deemed necessary, the said sections may be bolted or riveted together, the said bolts or rivets (not herein shown) being extended through the flanges $b$.

My improved conduit is herein shown as employed for an electric street-railway, it being located between the rails $b^2$ $b^3$, forming the track upon which travels the car. (Not herein shown.)

The electric system herein shown is substantially that employed by the well-known Sprague Motor Company, it consisting of a main feed, $b^4$, and return-conductor $b^5$, located in the slot-chamber $a'$, and auxiliary feed-conductors $b^6$, located in the accessible chamber $a$. The main feed $b^4$ and return-conductors $b^5$ are naked wires, and in practice have co-operating with them trolley-wheels, (not herein shown, as they form no part of my invention,) the said trolley-wheels in practice being electrically connected with the motor carried by the car by conductors (not shown) extended through the slot $a^4$.

The conductors $b^4$ $b^5$ are supported, as herein shown, by two arms, $b^7$ $b^8$, screwed or otherwise secured together, the arm $b^7$ being shown as screwed into a bell-shaped block, $b^9$, of insulating material, the said block, as shown, being secured by screws $b^{10}$ to a bridge-piece, $b^{12}$, spanning the slot $a^3$ and secured to the wall $a^2$ on opposite sides of the said slot, as shown, by screws $b^{13}$. (See Fig. 2.) The arms $b^7$ $b^8$ will preferably be of the shape shown in Fig. 2, and will extend around about two-thirds of the circumference of the conductors or wire, so that the trolley-wheel co-operating with the said wire may have a smooth surface to act or run upon.

Each auxiliary conductor $b^6$ is connected to the main conductor $b^4$, as shown in Fig. 4, by an auxiliary feed-connection, $b^{14}$, extended through the slot $a^3$, as shown in Fig. 3. The auxiliary conductors are of the same polarity as the wire $b^4$, and are connected to the same dynamo, 50, as herein shown, or they may be connected to different dynamos. These auxiliary wires are simply carrying-wires, and as they do not do work they increase the potential of the main conductor at the points where they are connected to it.

The accessible chamber $a$ contains, as herein shown, a pipe, $c$, through which may be forced either live or exhaust steam, or heated air, or other medium by which the said accessible chamber may be maintained at a substantially high temperature, thus keeping dry the conductors and connections between them and obviating waste of current due to grounding of said conductors by moisture or by other cause. The heat in the accessible chamber passes through the opening $a^3$ into the slot-chamber $a'$, thus maintaining this latter chamber at a temperature sufficiently high to prevent or largely obviate the formation therein of ice in cold weather, and also to keep the conductors and connections in said slot-chamber substantially dry.

The slot-chamber is provided with ducts or passages $c'$, preferably one for each conduit-section, (see Fig. 1,) the said duct or passage connecting the said slot-chamber with a sub-drain, $c^2$, located beneath and lying substantially parallel with the conduit, the said sub-drain being connected at suitable intervals with catch-basins or sewers, (not herein shown,) and being of sufficient area to carry off all the water that may enter the slot-chamber through the slot $a^4$, the conduit-section being supported at its ends, as herein shown, by beams 20 resting on the said sub-drain.

The heater-pipe $c$ may be composed of short sections of pipe, which may be put together after the conduit is laid or completed, the said sections being passed into the accessible chamber $a$ through the opening in each section, the covers $a^5$ $a^6$ being removed; but I prefer to have each pipe-section longer than a conduit-section, and to joint up or complete the pipe after a sufficient number of sections have been laid, so that the joints of the said pipe will come below the removable covers.

The conductors $b^4$ $b^5$ are rigidly supported in each section, which imparts a tautness to the said conductors, whereby a substantially rigid base is afforded for the trolley-wheels to act upon, and this, together with the form of supports, gives a uniform passage of current, thus effecting a substantially smooth and easy travel of the car.

To repair, renew, test, clean, or otherwise act upon the conductors, or to repair or renew the heating-pipe in the accessible chamber, or to repair or renew the conductors or any part of the mechanism in the slot-chamber, it is only necessary to remove the covers of a single section to gain access to the accessible chamber, and from that to the slot-chamber through the opening $a^3$.

The main and auxiliary conductors may be laid in their respective chambers as each conduit-section is laid; but, if desired, they may be laid after the conduit is completed.

I have thus far described my improved conduit as employed for an electric street-railway, but it is evident it may be employed equally well for a cable railway, the cable and gripping mechanism being located in the slot-chamber, and so, also, it is evident that both systems may be employed together.

My improved conduit will preferably be made of iron, but instead thereof it may be made of wood or other suitable material.

I have herein described each conduit-section as provided with removable covers and an opening, $a^3$; but it is evident that the said conduit may have one or more conduit-sections made plain or solid—that is, without either the removable covers or opening $a^3$—the interposition of such conduit-sections being so regulated as to yet leave the conduit accessible at frequent or desired intervals.

I claim—

1. The combination, with a conduit having a longitudinal slot in its top at one side thereof and a single division-wall extending from said slot to the base of said conduit to form chambers, the said wall being provided at intervals with openings $a^3$, to afford communication between said chambers, of an electric conductor located in one chamber, substantially as described.

2. The combination, with a conduit having an accessible chamber, $a$, and a slot-chamber, $a'$, communicating with each other, of an electric conductor located in said slot-chamber, and an auxiliary conductor located in the said accessible chamber and connected to the main conductor in the slot-chamber, substantially as described.

3. The combination, with a conduit composed of independent sections having a longitudinal slot and provided with a division-wall extended the length of the said sections to form a communicating slot-chamber and accessible chamber, of a removable cover for the said accessible chamber, a main conductor located in said slot-chamber, an auxiliary conductor in said accessible chamber, and a feed-conductor connecting said main and auxiliary conductors, substantially as described.

4. The combination, with a conduit composed of independent sections having a longitudinal slot and provided with a division-wall extended the length of the said sections to form a communicating slot-chamber and accessible chamber, of a removable cover for the said accessible chamber, a main conductor located in said slot-chamber, and an auxiliary conductor in said accessible chamber, and a feed-conductor connecting said main and auxiliary conductor, and a pipe located in the accessible chamber and adapted to convey a heating medium through the said slotted chamber, substantially as and for the purpose specified.

5. A conduit for railways, it consisting of a plurality of independent contiguous sections fitted together at their ends and shaped to form two chambers, $a$ $a'$, extended from end to end of each section, the said chambers being separated by an inclined wall, $a^2$, having openings $a^3$, the top part, 2, of the sections forming the roof for the chamber $a$, leaving openings at suitable intervals to afford access to the chamber $a$ from the street, the said top part, 2, and inclined wall $a^2$ being brought together to form an edge and leave between the said edge and the side wall, 4, of the section a long open slot, $a^4$, extended from end to end of each section and opening into the chamber $a'$, the described openings made in the top part, 2, being each closed by a cover to form, in connection with the top part, 2, a continuous tread-surface at the street, substantially as described.

6. A conduit for railways, it consisting of a plurality of independent contiguous sections fitted together at their ends and shaped to form two chambers, $a$ $a'$, extended from end to end of each section, the said chambers being separated by an inclined wall, $a^2$, having openings $a^3$, the top part, 2, of the sections forming the roof for the chamber $a$, leaving openings at suitable intervals to afford access to the chamber $a$ from the street, the said top part, 2, and inclined wall $a^2$ being brought together to form an edge and leave between the said edge and the side wall, 4, of the section a long open slot, $a^4$, extended from end to end of each section and opening into the chamber $a'$, the described openings made in the top part, 2, being each closed by a cover to form, in connection with the top part, 2, a continuous tread-surface at the street, and carriers $b^7$ $b^8$ to support conductors placed in the said conduit, substantially as described.

7. A conduit for railways, it consisting of a plurality of independent contiguous sections fitted together at their ends and shaped to form two chambers, $a$ $a'$, extended from end to end of each section, the said chambers being separated by an inclined wall, $a^2$, having openings $a^3$, the top part, 2, of the sections forming the roof for the chamber $a$, leaving openings at suitable intervals to afford access to the chamber $a$ from the street, the said top part, 2, and inclined wall $a^2$ being united together to form an edge and leave between the said edge and the side wall, 4, of the section a long open slot, $a^4$, extended from end to end of each section and opening into the chamber $a'$, the described openings made in the top part, 2, being each closed by a cover to form, in connection with the top part, 2, a continuous tread-surface at the street, the chamber $a'$ being provided with several independent discharge-openings, as $c'$, communicating with a sub-drain, $c^2$, located between the tracks, substantially as described.

In testimony whereof I have signed my name to this specification in the presence of two subscribing witnesses.

HENRY A. CHASE.

Witnesses:
 JAS. H. CHURCHILL,
 B. DEWAR.